Aug. 13, 1940.   W. H. FORD   2,211,562
PROPELLER FINISHING MACHINE
Filed Nov. 30, 1938   3 Sheets-Sheet 2

INVENTOR
William H. Ford
BY
Bean, Brooks, Buckley & Bean
ATTORNEYS

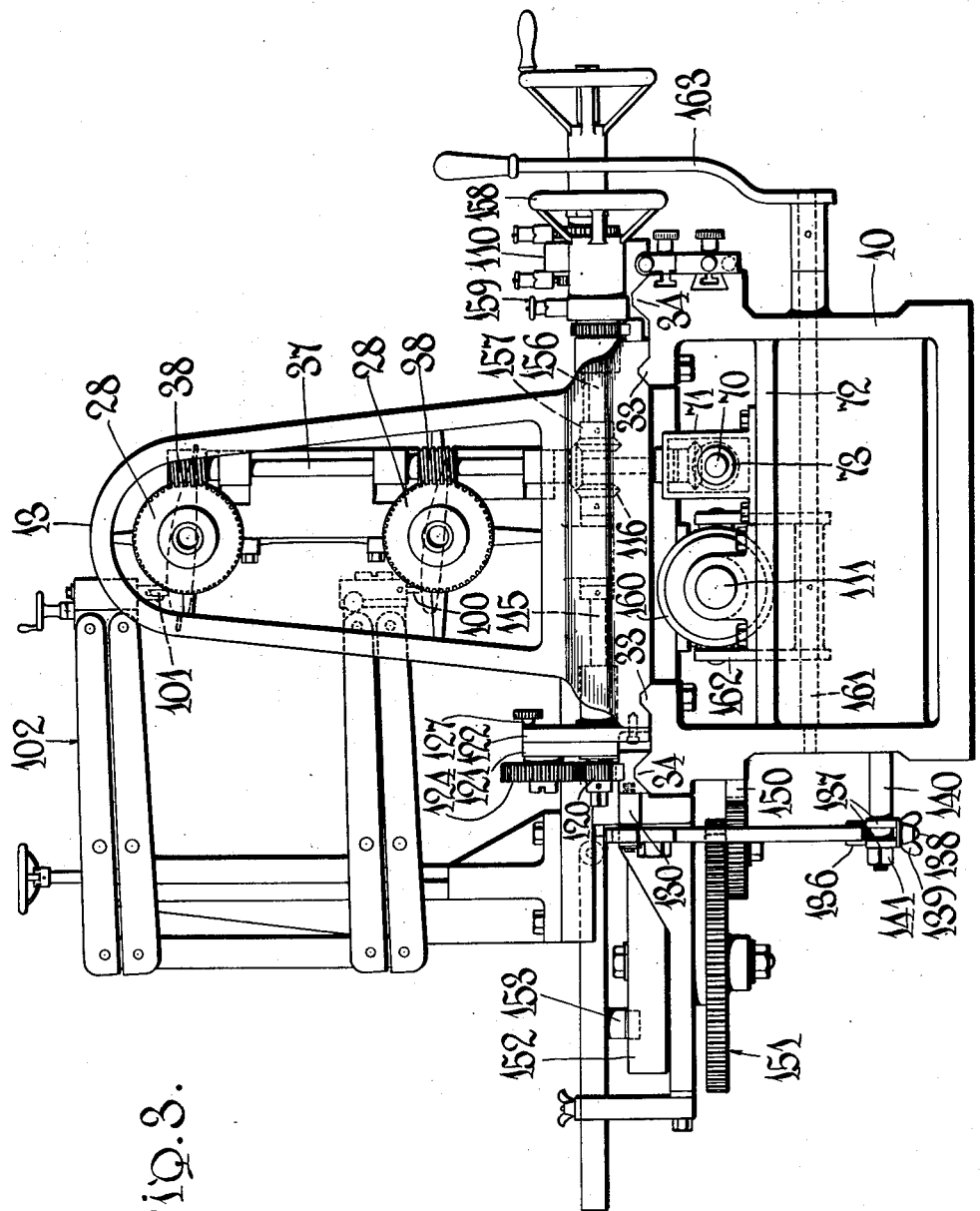

Patented Aug. 13, 1940

2,211,562

UNITED STATES PATENT OFFICE 2,211,562

PROPELLER FINISHING MACHINE

William H. Ford, Williamsville, N. Y.

Application November 30, 1938, Serial No. 243,222

25 Claims. (Cl. 90—24.3)

This invention relates to a method and means for machining propeller blades and like surfaces.

The machine of the present invention comprises an improvement in the novel machine tool disclosed in my copending application, Serial No. 211,874, filed June 4, 1938, and is similar to the machine there shown and described in respects which will hereinafter appear.

My present invention is herein shown and described in connection with the surfacing of airplane propeller blades, but it is to be understood that the device of the invention and the method set forth may be employed in other applications and in fact wherever it is desired to impart a smooth machined surface to an analogous irregular or curvilinear surface or profile.

In the machine which forms the subject matter of my copending application longitudinal cutting strokes somewhat analogous to the strokes of a machine shop planer or shaper are effected. That machine, however, contemplates the effecting of cutting strokes in both directions of movement of the cutting means, thereby eliminating the usual idle return stroke. In that machine the tool itself is so supported that it may be moved transversely of its direction of reciprocation for either automatically or manually feeding the tool laterally with respect to the surface of the work in either transverse direction.

Still referring to the machine of my copending application, means independent of the transverse feed means are provided for guiding the tool in a curving path with respect to a vertical longitudinal plane, with and in response to movements of a follower or tracer member which moves along a master control element. Further means are provided for causing the cutting means to follow a predetermined curvilinear path with respect to a horizontal plane, such path corresponding roughly with the curve of the edge of a propeller blade when viewed looking directly at its flat side.

My present invention involves the mode of support and presentation of the work piece and the master control element and a feature of the invention resides in the fact that means are provided for rotating the work piece and the master element on their longitudinal axes in a special manner. The rotation of these elements is arranged to be in timed relation and preferably in such manner that both ends of each of these relatively elongated members are positively and synchronously rotated. Such positive driving of both ends has been found to add greatly to the accuracy of the resulting product and to the general stability of the machine in operation.

A further improvement involved in my present invention comprises a new mode of effecting cutting strokes wherein synchronous axial rotation of the work piece and the master element takes place during a whole or a part of the longitudinal cutting stroke in phase with and in predetermined relation to such longitudinal cutting strokes. The particular nature and character of such axial rotation will depend in each case upon the form of the work piece to be produced but by way of example I shall now briefly discuss the general mode of operation in connection with the production of an airplane propeller blade of one particular type.

A common present day type of airplane propeller comprises a central mounting hub with two or three blades radiating therefrom. Each blade is made as a separate piece and in some forms the blades, from their midpoints to their outer extremities, are substantially flat and almost planar, while from their mid-points to their inner extremities their angles of attack increase rapidly; that is to say, the angle of attack of the blade is very large adjacent the hub end and this angle decreases, rapidly at first and then more gradually, so that along the outer half of the blade the change in angle of attack is comparatively small.

When working on a blade of the kind just described, the outer half may be cut with the work piece and the master element substantially stationary since there is very little change in the angle that the cutting tool makes with the work surface. As the cutting tool approaches the other half of the blade, however, the change in angle of attack is such that best operation is achieved if the master element and the work piece are rotated on their axes so that a more nearly horizontal surface is presented to the cutting tool.

In one form of my present invention this result is accomplished by providing means which begin to rotate the master element and the work piece at a predetermined point along the propeller blade during those cutting strokes which begin at the outer extremity or tip end of the blade. This rotation is preferably gradual and progressive and may continue to the end of the cutting stroke in the direction specified. On the return cutting stroke the master element and the work piece are rotated reversely and along the same portion of the blade as they are rotated on the first mentioned stroke. That is, on the return stroke the master element and the work piece are rotated beginning at the beginning of the cutting stroke and the rotation stops when the cutting tool reaches the same point along the blade at which rotation began on the preceding stroke in the opposite direction.

In this manner adjustment of the angle of presentation of the surface of the work piece to the cutting tool is made only at those points along the work piece where the change in such angle is sufficient to indicate that such adjustment will result in improved operation of the cutting tool.

In the drawings:

Fig. 3 is an end elevational view of the machine taken from the right hand end as viewed in Figs. 1 and 2 and with the headstock cover removed to show the mechanism therein; and Fig. 4 is detailed elevational view of gearing for operating the work and master element rotating means viewed as in Fig. 1 but on a larger scale.

Figure 1:
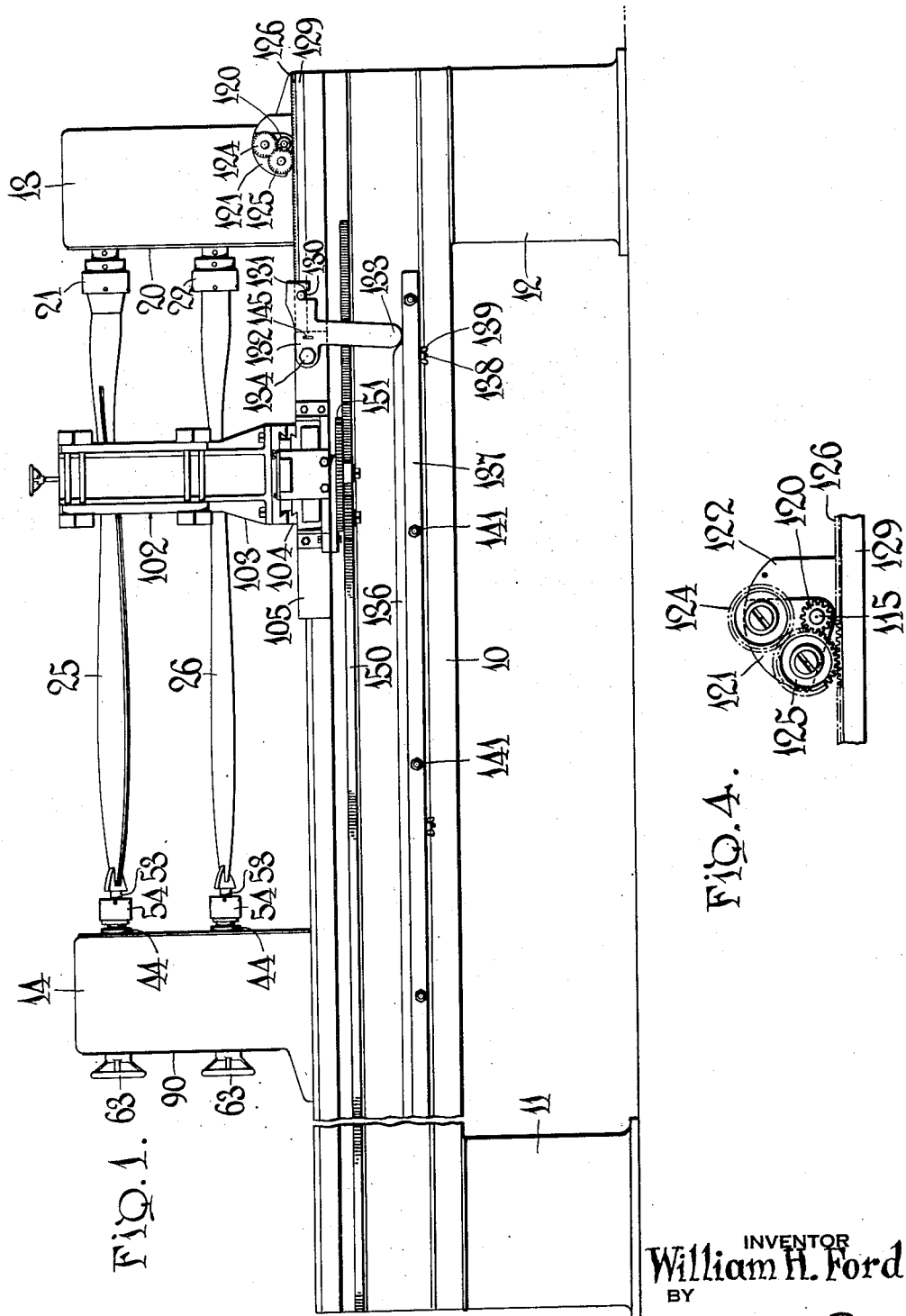
Fig. 1 is a general rear elevational view of the machine of my present invention.

In the drawings like characters of reference denote like parts and the numeral 10 designates an elongated bed supported at either end on pedestals 11 and 12. The general relationship of parts in my present invention, insofar as the transmission of motion from the driving motor to the main drive or transmission screw is concerned, is similar to that shown in my copending application referred to above. Reference may be had to that application for the general details of construction of the machine excepting insofar as they relate to the work supporting and rotating means and the master element supporting and rotating means.

Figure 2:
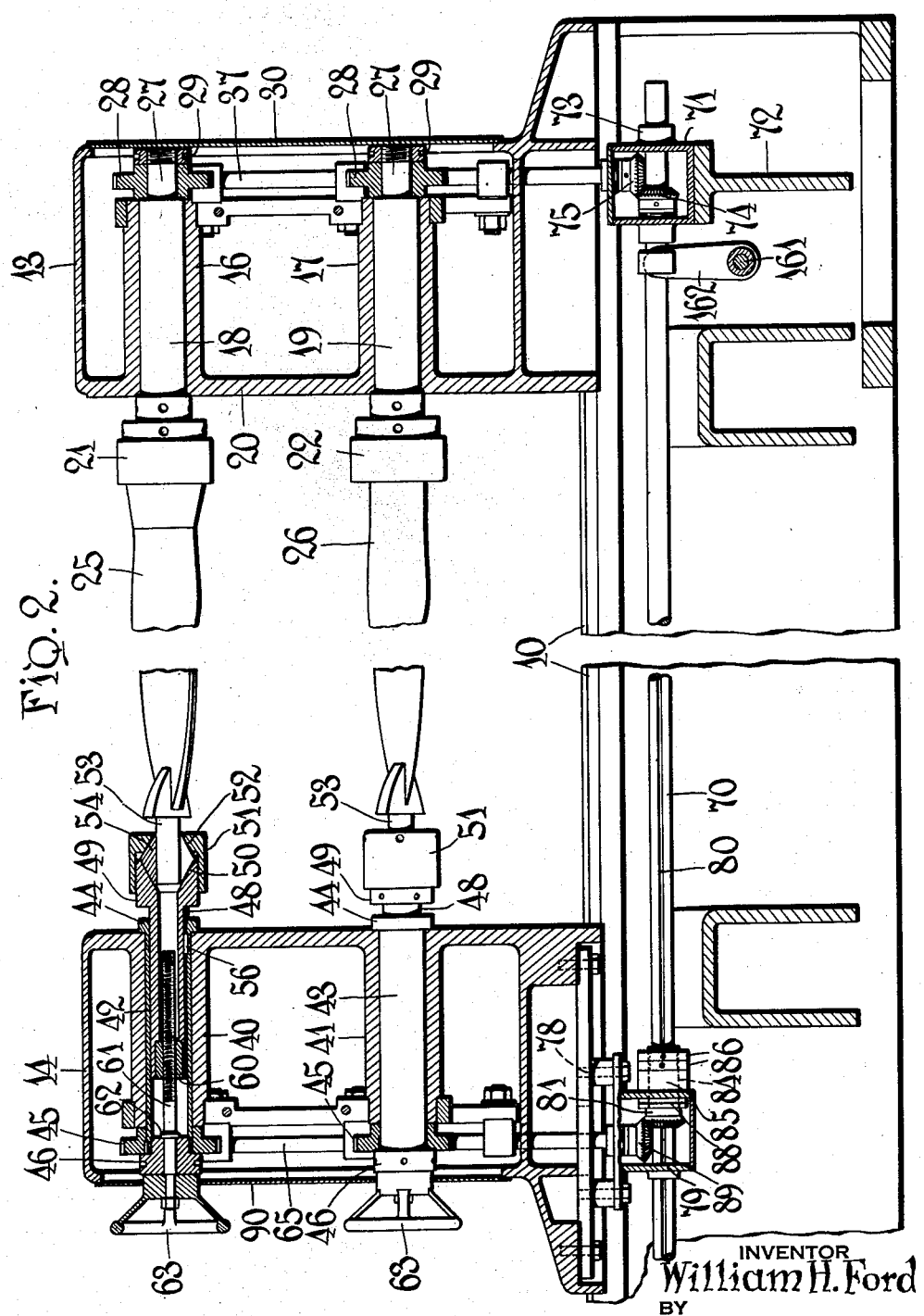
Fig. 2 is a longitudinal vertical cross sectional view of the machine viewed as in Fig. 1 but on a larger scale and with portions broken away.

The present machine is provided with a headstock 13 and a tailstock 14, both elements being shown in longitudinal cross section in Fig. 2. The headstock 13 has bearings 16 and 17 for rotatably supporting upper and lower spaced parallel spindles 18 and 19 respectively. The spindles extend through a wall 20 of the headstock 13 and terminate outside of the headstock in chucks 21 and 22 which are adapted to support, respectively, the ends of a master element and a work piece. A master element is shown in supported position at 25 and a work piece is similarly supported at 26.

At their other ends and within the casing portion of the headstock 13 each of the spindles 18 and 19 is provided with a reduced terminal portion 27 which supports a worm wheel 28. Each of the worm wheels may be held in place on the reduced portion by means of a collar 29 engaging threads upon the associated terminal portion 27 of a spindle.

A door or cover member 30 is disposed over an opening in the wall of the housing of the headstock 13 for giving access to the interior thereof and, to better illustrate the mechanism inside the headstock 13, the door 30 is not shown in Fig. 3, reference to which will now be had. The base or bed 10 of the machine is of generally channel form in cross section with each of its upper longitudinal edges provided with two ways or guides. The inner pair of ways 33 locate the headstock 13 and the tailstock 14 while the outer pair of ways 34 locate and guide the cutting mechanism in its reciprocatory movement.

A vertically extending shaft 37 is journaled in suitable bearings provided in the housing of the headstock 13 and has secured thereto a pair of axially spaced worms 38 for engagement one with each of the worm wheels 28 of the spindles 18 and 19. It will be clear that this construction couples the spindles for joint and synchronous rotation and automatic means for so rotating the spindles will be hereinafter described.

Referring now to the details of construction of the tailstock 14, reference is had to Fig. 2. The housing of the tailstock 14 is formed with horizontally extending parallel bearing portions 40 and 41 and the bearing portions 40 and 41 are in axial alignment with the bearing portions 16 and 17 respectively of the headstock 13. Journaled in the bearing portions 40 and 41 are a pair of rotatable spindles 42 and 43 respectively. The spindles 42 and 43 are identical in construction but for purposes of illustration only the upper spindle 42 is shown in longitudinal cross section. Each of the spindles protrudes through a wall of the housing of the tailstock 14 and terminates in a flange 44. At the other end of each spindle 42 and 43 a worm wheel 45 is keyed thereto for rotation with the spindle and the gears may be retained on their associated spindles as by collars 46 which engage threads formed upon the hollow interiors of the spindles 42 and 43. The worm wheels 45 cooperate with the flanges 44 to secure the spindles 42 and 43 against endwise movement.

It has been stated that each of the spindles 42 and 43 has a hollow interior and this construction is adopted for the purpose of receiving and accommodating axially adjustable collets for engaging and supporting the outer or tip end of a master element 25 and a work piece 26 respectively. Each of the collets, designated 48, comprises a sleeve-like body portion and an enlargement 49 at its work supporting end. The axial opening in the body portion of each of the collets terminates adjacent the enlargement 49 in an outwardly flaring portion 50, and a cap member 51 having an internally threaded annular flange is threaded over the enlargement 49. Each cap member has an axial opening 52 of flaring form and opposed to the flaring portion 50 of the opening in the body of its associated collet 48.

Mandrels 53 are rigidly associated with the tip end of the master element and the tip end of the work piece in any convenient manner as by welding, brazing, mechanically clamping or otherwise. The mandrels 53 protrude through the openings 52 in the collet caps 51 and are surrounded within the caps 51 by split clamping rings 54. The clamping rings 54 have opposed conical faces for engagement with the flaring openings 50 of the collets and the flaring openings 52 of the caps 51. It will readily appear that as each cap 51 is screwed onto an enlarged portion 49 of a collet its associated clamping ring 54 will be compressed between the flaring openings 50 and 52 in the collet and the cap, respectively, and the engaged mandrel 53 will be thereby rigidly associated with its related collet 48.

Each of the collets 48 is adapted to have axial sliding movement with respect to its associated spindle 42 or 43 but relative rotation between associated collets and spindles is prevented by means of splines or sliding keys 56. For controlling the axial movement and disposition of each of the collets 48 the end of the body portion thereof which is opposite the enlargement 49 is provided with a rigidly associated and internally threaded block 60. Engaging the internal threads of the blocks 60 are screws 61 which extend through the collars 46 and are prevented from having axial movement with respect to the collars 46 by virtue of cooperation between flanges 62 formed upon the screws and hand-wheels 63 which are secured upon outer reduced portions of the screws 61. The connection of each handwheel 63 to its associated screw 61 is such as not to interfere with free rotation of the screw with respect to its associated collar 46.

It will now be evident that rotation of either of the screws 61 by manipulation of its handwheel 63 will, through the threaded engagement between the screw and the block 60, cause axial movement of the collet 48 with respect to its associated spindle 42 or 43. By moving one of the collets 48 to the left, as seen in Fig. 2, a positive longitudinal tension may be applied to either the master element or the work piece as the case may be. The application of such tension has been found to greatly improve the operation of the machine and the quality of the resulting product. Vibration of the work piece and associated parts is eliminated and the tendency of the work piece to flex is reduced to the point where no intermediate support is required.

The housing of the tailstock 14 is provided with suitable bearings for supporting a vertical shaft 65 which corresponds with the vertical shaft 37 of the headstock 13 and also has secured thereto a pair of spaced worms (not shown) for engagement with one of each of the worm wheels 45. As was stated in connection with the headstock 13, this arrangement causes both of the tailstock spindles to rotate together and in absolute synchronism with each other.

As will be noted best from an inspection of Fig. 2, the vertical shafts 37 and 65 of the headstock 13 and the tailstock 14, respectively, extend downwardly through those elements and into the longitudinal opening formed by the channel shaped cross section of the bed 10. It is desired that rotative movements of all of the spindles, 18, 19, 42 and 43, be synchronously and positively effected and to this end a synchronizing shaft 70 extends longitudinally of the machine in the opening in the top of the bed just referred to. A casing 71 disposed upon a cross rib 72 of the bed 10 embodies bearings 73 which support one end of the synchronizing shaft 70.

Within the casing 71 the synchronizing shaft 70 has secured thereto a bevel gear 74 which engages with a bevel gear 75 provided at the lower end of the vertical shaft 37 of the headstock 13. At its opposite end the synchronizing shaft may be journaled in a suitable bearing provided in the frame work of the bed 10 in the usual manner although such opposite end of the shaft is not illustrated in Fig. 2.

Secured to the bottom of the tailstock 14 by means of screws 78 is a casing 79. The synchronizing shaft 70 extends through the casing 79 and suitable bearings are incorporated in the latter for permitting both rotative and axial movement of the synchronizing shaft with respect to the casing 79. The shaft 70 is provided with a relatively long keyway 80 and a bevel pinion 81 is mounted upon the shaft 70 within the casing 79 for free axial sliding movement, the pinion being provided with a key for sliding engagement in the keyway 80 to prevent relative rotative movement between the pinion 81 and the shaft 70.

The pinion 81 has a relatively long hub shown in dotted lines at 84. The hub 84 extends through the bearing 85 of the casing 79 and at its outer end collars 86 are secured to the hub to prevent movement of the pinion 81 relative to the casing. A thrust ball bearing 88 may be interposed between the pinion 81 and the face of the bearing 85 of the casing 79. A meshing bevel pinion 89 is secured to the lower extremity of the vertical shaft 65 of the tailstock 14 for engagement with the pinion 81.

The construction just described permits free longitudinal adjustment of the tailstock 14 along the bed 10 without interfering with the driving connection existing between the synchronizing shaft 70 and the spindles 42 and 43 of the tailstock.

In the form of machine specifically disclosed herein the worms on the shaft 65, which mesh with the worm wheels 45, are of opposite hand with respect to the worms 38 on the shaft 37. The worms 38 being right hand, the worms 66 are left hand. This is not a necessary limitation, however, since either bevel gear, 74 or 81, may mesh with its associated pinion on the side opposite that disclosed for driving the associated pinion in an opposite direction to that now contemplated.

It is apparent from the foregoing that all rotative movements occurring in the spindles of the headstock will be transmitted and duplicated in the spindles of the tailstock by the synchronizing shaft 70 and the associated vertical shafts 37 and 65, and vice versa. The tailstock 14 may be provided with a door or cover 90 for giving access to the interior mechanism thereof.

So far I have described means for synchronizing the rotative movements of the head and tailstock spindles and I shall now direct my description to means for automatically imparting rotative movements to such spindles in accordance with a predetermined method of operation. Referring particularly to Figs. 1 and 3, my present invention embodies pattern following or tracing mechanism and cutting mechanism which is in general quite similar to the pattern follower and cutting mechanism of my co-pending application described above. Such means includes generally a cutting tool 100 and a pattern follower roller 101, both of which elements are supported by linkage mechanism designated generally 102 and so arranged as to cause the cutting tool 100 to duplicate all vertical movements of the follower roller 101.

The cutting tool, the follower roller, and the linkage mechanism 102 are all supported by a bracket 103 which is mounted upon a plate 104 for sliding movement which is transverse with respect to the longitudinal extent of the machine. The plate 104 is in turn mounted upon base means 105, also for transverse sliding movement with respect thereto, and the base means 105 is disposed upon the outer pair of ways 34 of the base 10 as has previously been suggested.

Stated briefly, the bracket 103 is moved transversely on the plate 104 and with respect thereto, either manually or in automatic step-by-step movement imparted thereto by the traverse feed mechanism designated generally 110 in Fig. 3. This is somewhat analogous to the usual traverse feed of the cutting mechanism or the work in machine tools where an increment of cross feed takes place between successive cutting strokes.

The plate 104, which carries the bracket 103 and the traverse feed mechanism 110 in their entireties, is in turn adapted to be moved transversely with respect to the base 105, the base 105 being mounted for movement in a longitudinal direction only with respect to the base 10. The transverse movement between the plate 104 and the base means 105 is adapted to take place during cutting strokes for the purpose of causing the cutting tool to travel in a predetermined curving path which corresponds generally to the curve demarcating an edge of the propeller blade.

Reciprocation of the base means 105 of the cutting instrumentalities together with all of the mechanism disposed thereon is effected by means of a transmission screw 111 which is adapted to be driven alternately in opposite directions of rotation to produce reciprocating movement of the cutting mechanism on the bed 10, all in the manner illustrated in my copending application.

For producing automatic rotation of the master element and work supporting spindles during cutting strokes a shaft 115, see Fig. 3, is journaled in bearings formed in the lower portion of the headstock 13. At one end of the shaft 115 has fixed thereto a bevel pinion 116 which meshes with a bevel pinion fixed to the vertical shaft 37 of the headstock 13.

At its other end the shaft carries a pinion 120, a swinging plate 121 which is mounted for free pivotal movement upon the shaft 115, and an adjacent plate 122 which is fixed to the base portion of the headstock 13. As may be seen from Fig. 4, the pinion 120 is in constant mesh with a gear 125 which is supported for idle rotation by the swinging plate 121. The gear 125 is in constant mesh with a second idle gear 124 of the same size and likewise supported by the swinging plate 121. A rack bar 126 is disposed below but not in mesh with the pinion 120.

When the several gears and the swinging plate 121 are in the position shown in Fig. 4 longitudinal movement of the rack bar 126 will cause rotation of the pinion 120 through the medium of the gear 125. Suitable means are preferably provided for retaining the swinging plate 121 in its illustrated position. Such means may take the form of a pin 127 carried by the fixed plate 122 and having a releasable projecting part adapted to engage an opening provided in the swinging plate 121 at any desired position of adjustment.

With the parts as shown movement of the rack bar to the right as shown in Figs. 1 and 4 will produce clockwise rotation of the shaft 115 while movement of the rack bar to the left will produce counterclockwise rotation. If it be desired that corresponding movements of the rack bar produce opposite rotations of the shaft 115, the detent pin 127 may be released and the swinging plate 121 moved in a clockwise direction about its pivot on the shaft 115 until the gear 124 comes into mesh with the rack bar 126, the other idle gear having in the meantime moved out of mesh with the rack bar 126. Drive of the shaft 115 by the rack bar 126 will then be through the gear 124, the gear 125, and the pinion 120 and the alternate directions of rotation will have been reversed.

It is at times desired to render the spindle oscillating means inoperative and to this end the swinging plate is provided with a suitably located opening for receiving the detent pin 127 to hold the swinging plate 121 in an intermediate position where both of the gears 124 and 125 are wholly out of engagement with the rack 126.

The rack 126 proper sets into a bar 129 whose under surface is grooved to fit one of the ways 34 formed upon the base 10 for longitudinal sliding movement thereon, see Fig. 3. The rack supporting bar 129 has fixed thereto a laterally extending pin 130 for engagement with a notch 131 provided in one leg of a bell crank 132. The other leg of the bell crank 132 extends downwardly, see Fig. 2, and has a rounded terminal portion 133. The bell crank itself is pivotally mounted against a lateral face of the base 105 of the longitudinally reciprocating cutting mechanism as by means of the pivot pin 134.

With the bell crank 132 and base 105 of the cutting mechanism in the relative positions shown in Fig. 1, further movement of the cutting mechanism to the right will result in an equal movement to the right of the slidably mounted rack bar 129 and the rack 126, which will in turn result in concurrent rotative movement of the four spindles 18, 19, 42 and 43, in a direction which depends upon the position of adjustment of the swinging plate 121 and the idle gears 124 and 125 carried thereby. This movement of the rack bar 129 with the cutting mechanism results from the fact that the rack bar and the base 105 of the cutting mechanism are in longitudinally abutting relation in the illustrated position.

After the cutting mechanism reaches its right hand limit of movement and reverses its direction of reciprocation the rack 126 and the rack bar 129 move to the left with the cutting mechanism due to engagement between the pin 130 of the rack bar 129 and the notch 131 in the bell crank 132. The movement to the left of the rack 126 and the rack bar 129 results in a reverse rotation of the several spindles, 18, 19, 42 and 43.

When, in its movement to the left as seen in Fig. 1, the cutting mechanism reaches the position there illustrated, the rounded terminal portion 133 of the bell crank 132 comes into engagement with a cam bar 136 which is disposed along the base 10 and may be secured in adjusted position upon a pair of spaced bars 137 as by means of screws 138 which are threaded into the cam bar 136 and extend downwardly between the spaced bars 137 where they are provided with wing clamping nuts 139. The spaced bars 137 may be secured in spaced adjusted position with respect to the base 10 by a plurality of supporting pins or studs 140 having threaded ends engaged by nuts 141.

When the bell crank 132 comes into engagement with the cam bar 136 in movement of the cutting mechanism to the left, as seen in Fig. 1, it is rotated in a counterclockwise direction until the notch 131 is disengaged from the pin 130 carried by the rack bar 129, whereupon the cutting mechanism continues its movement to the left without carrying the rack 126 and the rack bar 129 with it. It will therefore be evident that automatic rotation of the spindles 18, 19, 42 and 43 ceases when the terminal portion 133 of the bell crank 132 reaches the cam bar 136 and no further rotation thereof occurs until the cutting mechanism has completed its reciprocation to the left, reversed its direction, and moved to the right to the position illustrated in Fig. 1, whereupon the base means 105 of the cutting mechanism comes into abutting engagement with the rack bar 129 and the bell crank substantially simultaneously rides off of the cam bar 136 and resumes engagement with the pin 130 of the cam rack bar 129.

The longitudinal disposition of the cam bar 136 may be varied by loosening the wing nuts 139 and moving the cam bar along the spaced bars 137 and it will now be clear that automatic rotation of the work and master element supporting spindles in a selected direction and during a selected portion of the cutting stroke may be conveniently effected. If desired, the pivotal movement of the bell crank 132 may be restricted by a pin and slot connection as at 145.

As was previously stated, the plate 104 and the bracket 103 together with the cutting mechanism carried thereby are adapted to be jointly moved transversely upon the base 105 of the cutting mechanism during cutting strokes for giving a horizontally curving path to the cutting stroke. This curvature of path may be attained by securing a rack bar 150 to the base 10 as is best shown in Fig. 1. Gearing, designated generally 151 and carried by base 105 of the cutting mechanism, engages the rack bar 150 and is rotated by longitudinal movement of the cutting mechanism for rotating a cam 152, see Fig. 3. A cam follower 153 is carried by the plate 104 and engages a cam track in the cam 152 by reason of which engagement transverse movement of the plate 104 and the cutting mechanism carried thereby, in a predetermined relation to the longitudinal movement of the cutting mechanism, is effected. This mechanism is the same in theory of operation as that shown for accomplishing a like purpose in my before-mentioned copending application.

Referring now particularly to Fig. 3, further mechanism is provided for automatically rotating the master element and the work piece in step-by-step fashion between successive cutting strokes. Such step-by-step rotary movement of the master element and the work piece is advantageously employed when operating on the very nearly circular portions of the work piece which are found closely adjacent the hub of the propeller blade. In such operation the oscillating movements of the spindles 18, 19, 42 and 43 during cutting strokes are not desired and consequently the swinging plate 121 is moved to a neutral position in the manner heretofore described.

A shaft 156, coaxial with the shaft 115, is journaled in suitable bearings formed in the headstock 13 and has at one of its ends a bevel pinion 157 which engages the pinion 117 of the vertical shaft 37. At its other end the shaft is provided with a handwheel 158 for manually producing synchronous rotation of the work and master element supporting spindles and intermediate of the ends of the shaft automatic means, designated generally 159, for producing step-by-step rotation of the shaft 156 and consequently of the several spindles, are disposed. Such automatic means may assume any convenient form of selectively reversible traverse feed, preferably actuable by movement of the reciprocating cutting mechanism into contact with an actuating member on the automatic means 159 when an end of the cutting stroke is reached, and also preferably rendered operative or inoperative as required.

For the sake of simplicity, and because the details of construction of the actual means for producing small equal increments of rotation of the shaft 156 between cutting strokes are not intimately involved in the present invention, those details are not shown or described herein. Two exemplary forms of satisfactory mechanism for producing the desired result will be found in Figs. 4 and 6 and in Figs. 22 and 23 of my copending application referred to above although other and perhaps better means for performing the desired function may be conceived and employed.

In Fig. 3 the numeral 160 designates a clutch of conventional form for controlling operation of the main drive screw 111 of the machine and a shaft 161 which carries clutch shifting arms 162 is journaled in the bed 10 of the machine. The clutch shifter may be manipulated by a lever 163 which is secured to the shaft 161 at the outside of the machine.

While a single specific adaptation of the principles of my invention has been shown and described, it is to be understood that various changes and modifications in the construction can be made without departing from the spirit and scope of the invention as defined in the appended claims. While rotation of the work piece and the master element during a predetermined portion of the cutting stroke has been referred to herein it is apparent that rotation can, if preferred, occur during the entire cutting stroke, and the ratio existing between reciprocation of the cutting tool and rotation of the work piece and master element may be varied both as to relative speed and duration, according to the particular demands of the article to be produced.

I claim:

1. In a machine tool for reproducing and finishing compound curved surfaces of airplane propeller blades and the like by means of a master control element, work supporting means comprising spaced elements each adapted to engage and support one end of a work piece and a corresponding end of a control element, cutting means reciprocable longitudinally between said spaced supporting elements for effecting cutting strokes, and means for synchronously rotating said master element and said work piece during cutting strokes and in timed relation with reciprocations of said cutting means.

2. In a machine tool for reproducing and finishing compound curved surfaces of airplane propeller blades and the like by means of a master control element, work supporting means comprising spaced elements each adapted to engage and support one end of a work piece and a corresponding end of a control element, cutting means reciprocable longitudinally between said spaced supporting elements for effecting cutting strokes, and means actuated by and during the reciprocation of said cutting means for rotating the work piece and the master element in timed relation therewith.

3. In a machine tool for reproducing and finishing compound curved surfaces of airplane propeller blades and the like by means of a master control element, work supporting means comprising spaced elements each adapted to engage and support one end of a work piece and a corresponding end of a control element, cutting means reciprocable longitudinally between said spaced supporting elements for effecting cutting strokes, means actuated by and during the reciprocation of said cutting means for rotating the work piece and the master element in timed relation therewith, and means for varying the lateral disposition of said cutting means between longitudinal cutting strokes.

4. In a machine tool for reproducing and finishing compound curved surfaces of airplane propeller blades and the like by means of a master control element, work supporting means comprising spaced elements each adapted to engage and support one end of a work piece and a corresponding end of a control element, cutting means reciprocable longitudinally between said spaced supporting elements for effecting cutting strokes, means for synchronously rotating said master element and said work piece during cutting strokes and in timed relation with reciprocations of said cutting means, and means for rotating said work piece and said master element between cutting strokes, said last two mentioned means being selectively and alternatively rendered operative.

5. In a machine tool for reproducing and finishing compound curved surfaces of airplane propeller blades and the like by means of a master control element, work supporting means comprising spaced elements each adapted to engage and support one end of a work piece and a corresponding end of a control element, cutting means reciprocable longitudinally between said spaced supporting elements for effecting cutting strokes, means for synchronously rotating said master element and said work piece during cutting strokes and in timed relation with reciprocations of said cutting means, means for rotating said work piece and said master element between cutting strokes, said last two mentioned means being selectively rendered operative in the alternative, and means to be rendered operative when the first mentioned rotating means is operative for varying the lateral disposition of said cutting means between cutting strokes.

6. In a machine tool for reproducing and finishing compound curved surfaces of airplane propeller blades and the like by means of a master control element, work supporting means comprising spaced elements each adapted to engage and support one end of a work piece and a corresponding end of a control element, cutting means reciprocable longitudinally between said spaced supporting elements for effecting cutting strokes, means automatically varying the lateral disposition of said cutting means during longitudinal cutting strokes, means for automatically moving said cutting means laterally between successive cutting strokes, and means for synchronously rotating said master element and said work piece during cutting strokes and in timed relation with reciprocations of said cutting means.

7. In a machine tool for reproducing and finishing compound curved surfaces of airplane propeller blades and the like by means of a master control element, work supporting means comprising spaced elements each adapted to engage and support one end of a work piece and a corresponding end of a control element, cutting means reciprocable longitudinally between said spaced supporting elements for effecting cutting strokes, means automatically varying the lateral disposition of said cutting means during longitudinal cutting strokes, and means for synchronously rotating said master element and said work piece during cutting strokes and in timed relation with reciprocations of said cutting means.

8. In a machine tool for reproducing and finishing compound curved surfaces of airplane propeller blades and the like by means of a master control element, work supporting means comprising spaced elements each adapted to engage and support one end of a work piece and a corresponding end of a control element, cutting means reciprocable longitudinally between said spaced supporting elements for effecting cutting strokes, means automatically varying the lateral disposition of said cutting means during longitudinal cutting strokes, means for synchronously rotating said master element and said work piece during cutting strokes and in timed relation with reciprocations of said cutting means, and means for synchronously rotating said master element and said work piece between successive cutting strokes, said last two mentioned means being selectively rendered operative in the alternative.

9. In a machine tool for reproducing and finishing compound curved surfaces of airplane propeller blades and the like by means of a master control element, work supporting means comprising spaced elements each adapted to engage and support one end of a work piece and a corresponding end of a control element, cutting means reciprocable longitudinally between said spaced supporting elements for effecting cutting strokes, means automatically varying the lateral disposition of said cutting means during longitudinal cutting strokes, means for automatically moving said cutting means laterally between successive cutting strokes, and means for synchronously rotating said master element and said work piece during cutting strokes and in timed relation with reciprocations of said cutting means, and means for synchronously rotating said master element and said work piece between successive cutting strokes, said means for moving the cutting means laterally between cutting strokes and the first mentioned rotating means on the one hand, and the second mentioned rotating means on the other hand, being selectively rendered operative in the alternative.

10. In a machine tool for reproducing and finishing compound curved surfaces of airplane propeller blades and the like by means of a master control element, means for supporting a work piece and means for supporting a control element, cutting means reciprocable longitudinally for effecting strokes, and means for synchronously rotating said master element and said work piece during cutting strokes and in timed relation with reciprocations of said cutting means.

11. In a machine tool for reproducing and finishing compound curved surfaces of airplane propeller blades and the like by means of a master control element, means for supporting a work piece and means for supporting a control element, cutting means reciprocable longitudinally for effecting cutting strokes, means for synchronously rotating said master element and said work piece during cutting strokes and in timed relation with reciprocations of said cutting means, and means for varying the relative lateral disposition of said cutting means between successive cutting strokes.

12. In a machine tool for reproducing and finishing compound curved surfaces of airplane propeller blades and the like by means of a master control element, means for supporting a work piece and means for supporting a control element, cutting means reciprocable longitudinally for effecting cutting strokes, means for synchronously rotating said master element and said work piece during cutting strokes and in timed relation with reciprocations of said cutting means, and means for imparting step-by-step rotation to said work piece and said master element between successive cutting strokes, said last two mentioned means being selectively rendered operative in the alternative.

13. In a machine tool for reproducing and finishing compound curved surfaces of airplane propeller blades and the like by means of a master control element, means for supporting a work piece and means for supporting a control element, cutting means reciprocable longitudinally for effecting cutting strokes, means for varying the relative lateral disposition of the cutting means between successive cutting strokes, means for synchronously rotating said master element and said work piece during cutting strokes and in timed relation with reciprocations of said cutting means, and means for imparting step-by-step rotation to said work piece and said master element between successive cutting strokes, said last two mentioned means being selectively rendered operative in the alternative, and said means for moving the cutting means laterally between cutting strokes being rendered operative when said first mentioned rotating means is operative.

14. In a machine tool for reproducing and finishing compound curved surfaces of airplane propeller blades and the like by means of a master control element, means for supporting a work piece and means for supporting a control element, cutting means reciprocable longitudinally for effecting cutting strokes, means for varying the relative lateral disposition of the cutting means during cutting strokes, means for synchronously rotating said master element and said work piece during cutting strokes and in timed relation with reciprocations of said cutting means, and means for imparting step-by-step rotation to said work piece and said master element between successive cutting strokes, said last mentioned means being selectively rendered operative in the alternative.

15. In a machine tool for reproducing and finishing compound curved surfaces of airplane propeller blades and the like by means of a master control element, means for supporting a work piece and means for supporting a control element, cutting means reciprocable longitudinally for effecting cutting strokes, means for varying the relative lateral disposition of the cutting means during cutting strokes, other means for varying the relative lateral disposition of the cutting means between cutting strokes, means for synchronously rotating said master element and said work piece during cutting strokes and in timed relation with reciprocations of said cutting means, and means for imparting step-by-step rotation to said work piece and said master element between successive cutting strokes, said last two mentioned means being selectively rendered operative in the alternative, and said means for moving the cutting means laterally between cutting strokes being rendered operative when said first mentioned rotating means is operative.

16. In a machine tool for reproducing and finishing compound curved surfaces of airplane propeller blades and the like by means of a master control element, work supporting means comprising spaced elements each adapted to support one end of a work piece and a corresponding end of a control element, means on one of said elements for engaging an end of a master control element and other means on said elements for engaging a corresponding end of a work piece, said master element and work piece engaging means being movably disposd with respect to said element whereby they may be moved to place said master element and said work piece under longitudinal tension, and cutting means reciprocable longitudinally between said spaced supporting elements for effecting cutting strokes.

17. In a machine for producing compound curved surfaces of airplane propeller blades and the like, means for supporting an elongate work piece, cutting means reciprocable longitudinally with respect to said work piece for effecting cutting strokes, means for rotating said work piece upon its longitudinal axis during a predetermined portion of each cutting stroke, and means actuable by the reciprocation of said cutting means for rendering said rotating means operative during such predetermined portions of cutting strokes.

18. In a machine for producing compound curved surfaces of airplane propeller blades and the like, means for supporting an elongated work piece, cutting means reciprocable longitudinally with respect to said work piece for effecting cutting strokes, means for rotating said work piece upon its longitudinal axis, means actuated by engagement with said cutting means in its longitudinal reciprocations for operating said rotating means, said last mentioned means being adjustably disposed with respect to the direction of reciprocation of said cutting means whereby rotation of the work piece may be caused to occur during predetermined portions of longitudinal cutting strokes.

19. In a machine for producing compound curved surfaces of airplane propeller blades and the like, means for supporting an elongate work piece, cutting means reciprocable longitudinally with respect to the work piece for effecting cutting strokes in both directions of reciprocation, means for rotating said work piece upon its longitudinal axis, and means actuable by engagement with said cutting means in its longitudinal reciprocations for operating said rotating means in opposite directions during reciprocation of the cutting means in opposite directions.

20. In a machine for producing compound curved surfaces of airplane propeller blades and the like, means for supporting an elongate work piece, cutting means reciprocable longitudinally with respect to the work piece for effecting cutting strokes in both directions of reciprocation, means for rotating said work piece upon its longitudinal axis in either direction, and means actuable by engagement with said cutting means in its longitudinal reciprocations for operating said rotating means in opposite directions during opposite reciprocations of the cutting means, said last mentioned means being adjustably disposed with respect to the direction of reciprocation of said cutting means whereby rotation of the work piece may be caused to occur only during predetermined portions of longitudinal cutting strokes.

21. In a machine for producing compound curved surfaces of airplane propeller blades and the like, means for supporting an elongate work piece, cutting means reciprocable longitudinally with respect to said work piece for effecting cutting strokes, means for rotating said work piece upon its longitudinal axis during a predetermined portion of each cutting stroke, means actuable by the reciprocation of said cutting means for rendering said rotating means operative during such predetermined portions of cutting strokes, and means associated with said last mentioned means for reversing the direction of rotation of the work piece achieved by reciprocation of the cutting means in a given direction.

22. In a machine for reproducing compound curved surfaces of airplane propeller blades and the like, means for supporting an elongated work piece, cutting means reciprocable longitudinally with respect to the work piece for effecting cutting strokes in both directions of reciprocation, means for rotating said work piece upon its longitudinal axis, means actuable by engagement with said cutting means in its longitudinal reciprocations for operating said rotating means in opposite directions during opposite reciprocations of the cutting means, and means for reversing the direction of rotation of the work piece achieved by reciprocation of the cutting means in a given direction.

23. In a machine for reproducing compound curved surfaces of airplane propeller blades and the like, means for supporting an elongate work piece, cutting means reciprocable longitudinally with respect to said work piece for effecting cutting strokes, means for rotating said work piece upon its longitudinal axis during a predetermined portion of each cutting stroke, means actuable by the reciprocation of said cutting means for rendering said rotating means operative during such predetermined portions of cutting strokes, and means for varying the relative lateral disposition of the work piece and the cutting means between successive cutting strokes.

24. In a machine tool for reproducing and finishing compound surfaces of airplane propeller blades and the like by means of a master control element, longitudinally reciprocable cutting means, work supporting means comprising spaced elements each adapted to support one end of a work piece and a corresponding end of a control element, rotatable means on each of said spaced supporting elements for engaging an end of a work piece and other rotatable means on each of said spaced supporting elements for engaging an end of a control element, means connecting the two rotatable means of one of the spaced supporting elements for joint rotation, means connecting the rotatable work engaging means of the other of the spaced supporting elements with the rotatable means of the one of the spaced supporting elements for joint rotation, and means actuable by reciprocation of said cutting means for actuating said rotatable engaging means during predetermined portions of longitudinal cutting strokes.

25. In a machine tool for reproducing and finishing compound surfaces of airplane propeller blades and the like by means of a master control element, longitudinally reciprocable cutting means, work supporting means comprising spaced elements each adapted to support one end of a work piece and a corresponding end of a control element, rotatable means on each of said spaced supporting elements for engaging an end of a work piece and other rotatable means on each of said spaced supporting elements for engaging an end of a control element, means connecting the two rotatable means of one of the spaced supporting elements for joint rotation, means connecting the rotatable work engaging means of the other of the spaced supporting elements with the rotatable means of the one of the spaced supporting elements for joint rotation, and means actuable by reciprocation of said cutting means for actuating said rotatable engaging means in opposite directions during opposite reciprocations of said cutting means.

WILLIAM H. FORD.